United States Patent [19]

Muellenberg

[11] Patent Number: 4,573,825
[45] Date of Patent: Mar. 4, 1986

[54] APPARATUS FOR MOUNTING A DISK TO A SHAFT

[76] Inventor: Ralph Muellenberg, Im Wiesengrund 6, D-4048 Grevenbroich 12, Fed. Rep. of Germany

[21] Appl. No.: 586,825

[22] Filed: Mar. 6, 1984

[30] Foreign Application Priority Data

Apr. 30, 1983 [DE] Fed. Rep. of Germany ....... 3315769

[51] Int. Cl.$^4$ ............................ B25G 3/20; F16B 2/00
[52] U.S. Cl. .................................... 403/370; 403/371; 403/374
[58] Field of Search ................ 403/374, 371, 370, 368

[56] References Cited

U.S. PATENT DOCUMENTS

| | | | |
|---|---|---|---|
| 1,371,212 | 3/1921 | Adams et al. ................... | 403/371 X |
| 2,749,157 | 6/1956 | Dennison ............................ | 403/370 |
| 3,958,888 | 5/1976 | Mullenberg ..................... | 403/370 X |

FOREIGN PATENT DOCUMENTS 2801466 7/1979 Fed. Rep. of Germany .

OTHER PUBLICATIONS

"Designing with BIKON Technology", 1979 Edition, p. 34.

Primary Examiner—Andrew V. Kundrat
Attorney, Agent, or Firm—Schwartz, Jeffery, Schwaab, Mack, Blumenthal & Evans

[57] ABSTRACT

The apparatus comprises a first conical ring which acts from the inside against a radially thin walled portion in the center opening of the disk and a second conical ring which acts against a radially thick walled partial area located adjacent the disk. The thin and thick walled portions are part of a flanged hub ring which is connected with the disk by bolts.

8 Claims, 1 Drawing Figure

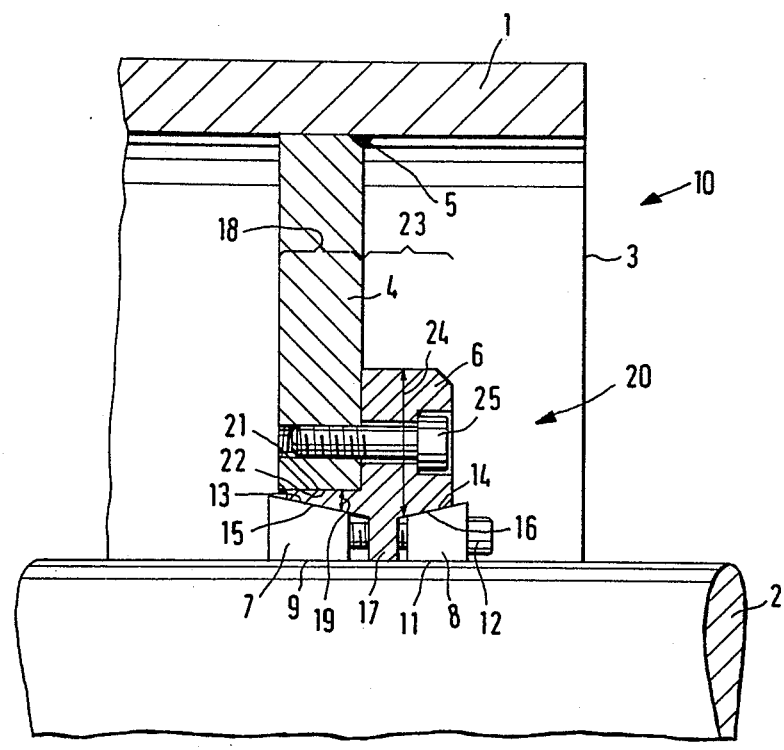

APPARATUS FOR MOUNTING A DISK TO A SHAFT

BACKGROUND OF THE INVENTION

The present invention relates to an apparatus for mounting a disk on a shaft, and more particularly to such an apparatus wherein the mounting is effected by axially slidable rings having conical surfaces which produce a radial pressure between the shaft and an inner opening on the disk.

A disk mount of this type is generally known from the company pamphlet "Designing with BIKON Technology," 1979 edition, page 34. In the known configuration, the disk is the bottom of a conveyor drive drum for the belt of a belt conveyor, such as the type used, for example, in surface mining of brown coal. Belt drive drums of this kind may have a length of 2 to 3 m, depending on the width of the conveyor belts. They transmit forces up to approximately 1500 kW to the conveyor belt by friction only. Correspondingly, the tension in the conveyor belt is substantial. The belt drive drums have continuous shafts, which may have diameters of up to 500 mm and are bearingly supported at positions spaced axially outside of the belt drive drum. In spite of the large dimensions of the shaft, a certain amount of sagging still occurs. This sagging is transmitted through a conical tightening mechanism to a flanged ring of the hub. The bolts connecting the hub with the bottom of the drum are exposed to the shear stresses resulting from the transmission of the torque during revolution of the drum as well as to the superposition of tensile stress peaks originating in the sag of the shaft. The tensile strength peaks alternate during drum rotation. This alternating fatigue stressing may lead to the fracture of the bolts.

In the embodiments shown in DE-OS No. 28 01 446, there is no separate flanged hub ring, but the drum bottom is thickened in the area where it joins the shaft. This, however, involves a significant increase in the cost of the drum bottom, the bottom must be milled from a solid body with the removal of a large amount of material in the form of chips, or else expensively cast or forged. The fabrication of the drum bottom from plate material is preferable. In another embodiment shown in DE-OS No. 28 01 446, a flanged hub ring is welded to the drum bottom. The same torque related stresses act on the weld joint as on the axial bolts of the aforementioned embodiment. Otherwise, however, the problem is not as pressing in the configuration discussed above since a tubular, rather than a solid shaft, is used. The tubular shaft has a relatively large diameter which is correspondingly rigid in bending, so that problems resulting from rotating bending fatigue exposures are reduced.

SUMMARY OF THE INVENTION

An object of the present invention is to provide an apparatus for mounting a disk on a shaft.

Another object of the present invention is to provide a mounting apparatus using a radial flange connected to the disk wherein the stress caused by the rotating bending force to the bolts arranged on the radial flange will be reduced.

A further object of the present invention is to provide a mounting apparatus which is relatively simple in construction yet highly durable and effective in use.

In accordance with the above objects, the present invention is an apparatus for mounting a disk on a shaft. The disk has a control opening through which said shaft extends. The apparatus comprises a flanged hub ring having an axially extending radially thin walled portion with an outer circumferential surface abutting an inner surface of the disk along the central opening of the disk. A radially thick walled portion is connected to the thin walled portion and disposed outside of the central opening. A pair of oppositely inclined conical surfaces are formed on the hub ring. Two individual rings are received at axially spaced positions on the shaft. The rings have oppositely inclined conical surfaces acting, respectively, with the conical surfaces of the hub ring. A mechanism is provided to move the rings relative to each other such that the conical surfaces of the rings produce a radially outward pressure on the conical surfaces of the hub ring.

The radially thick walled portion is positioned axially against an edge of the central opening and the conical surfaces on the hub ring are positioned on radially inner surfaces, respectively, of the thin and thick walled portions.

The mechanism for moving the rings may comprise screws connected to draw the rings toward one another.

The rings may be split into a plurality of segments and the radially thin walled portion may be split into a plurality of segments. The radially thick walled portion is a continuous ring around the shaft.

According to the present invention, the hub ring is not connected with the disk exclusively by the axial bolts. One conical ring clamps the flanged hub ring in one partial area directly against the inner circumference of the center opening of the disk. In this manner, part of the force is transferred directly to the disk, thereby relieving the bolts acting on the radial flange to this extent.

The term "radially thin walled" is intended to signify that the flanged hub ring does not offer extensive resistance to radial deformation caused by tightening the axial fastening bolts to draw the conical rings together and produce a wedge effect by the ring located adjacent the thin walled portion. Thus, the clamping action of the conical ring on the internal circumferential surface of the center opening remains largely undiminished. In contrast "radially thick walled" indicates that the other partial area of the hub ring has a radial dimension such that it is able to contain the radial clamping force of the conical ring located adjacent it.

This provides the advantage that the disk is not required to support the entire radial force of the conical clamping mechanism, which would otherwise be superposed on the stresses generated by the rotational deflection in the area around the center opening. Rather, only a proportionally reduced part of these stresses is borne by the disk. This permits a reduction of the dimensions of the drum bottom in the area of the center opening.

The invention is especially important not only in the case of belt drive drums, wherein particularly high forces are generated perpendicularly to the axis, but also in the case of other support or carrier drums with long axles, where the problem of rotational deflection must be taken into account. The invention offers advantages further in relation to brake disks for industrial purposes and similar applications.

BRIEF DESCRIPTION OF THE DRAWINGS

The above and other objects of the present invention will become more readily apparent when the invention becomes more fully understood from the accompanying drawing in which a partial longitudinal sectional view through a belt drive drum incorporating the mounting apparatus of the present invention is shown.

DETAILED DESCRIPTION OF THE PREFERRED EMBODIMENT

The belt drive drum designated in its entirety by 10, comprises a cylindrical jacket 1 forming the drum itself. Jacket 1 is arranged on a shaft 2 passing coaxially through the drum. In the vicinity of the end 3 (to the right in the drawing) of the jacket 1, a drum bottom in the form of a radial disk 4 is located. Disk 4 is joined by welding at 5 to the inner circumference of the jacket. The disk 4 is clamped onto the shaft 2 by a conical clamping mechanism designated in its entirety by 20.

The conical clamping mechanism 20 comprises a flanged hub ring 6 in the shape of a double conical ring and two individual conical rings 7 and 8. The individual conical rings 7, 8 have cylindrical internal circumferential surfaces 9, 11, through which they are seated on the shaft 2. The external circumferential surfaces 13, 14 of the conical rings 7, 8 are conical in shape and cooperate with the conical inner surfaces 15, 16 of the flanged hub ring 6. As shown, surfaces 15, 16 have essentially the same diameter and the same cone angle as surfaces 13, 14. The cone angles may be identical or different and may be within the self-locking range or not. Clamping bolts 12 pass through bore holes in the conical ring 8 and engage threaded bores of the conical ring 7. Upon tightening bolts 12, the conical rings 7, 8 approach each other, thereby generating a wedge effect and a radial clamping force.

For centering purposes, the flanged hub ring 6 has a radially inwardly directed circumferential shoulder 17 positioned axially between the conical surfaces 15, 16. Shoulder 12 has a cylindrical inner surface seated on the shaft 2 and receives the clamping bolts 12 through passage bores.

In the partial area 18, corresponding to the thickness of the disk 4 in the axial dimension of the flanged hub ring 6, the hub ring 6 is thin walled, as indicated by the arrow 19. The conical ring 7 located there is then able to deform the flanged hub ring 6 within the area 18 in the radially outward direction upon the tightening of the clamping bolts 12. In this manner, the cylindrical outer circumferential surface 21 of the flanged hub ring 6 is pressured against the cylindrical inner circumferential surface 22 of the center opening of the disk 4, thereby creating a direct frictional lock between the disk 4 and the shaft 2.

In the partial area 23 to the right (in the drawing) of the disk 4, the flanged hub ring 6 is thick walled, as indicated by the arrow 24. The radial forces generated by the action of the conical ring 8 upon the tightening of the clamping bolts 12 may thus be absorbed by the flanged hub ring 6 within the area 23. These radial forces are thus not transmitted to the disk 4.

In the partial area 23, the flanged hub ring 6 forms a radial flange abutting axially against the edge of the center opening of the disk 4. The flanged hub ring 6 is connected to disk 4 by axial bolts 25 distributed over the circumference with the disk 4. However, the bolts 25 transmit only a portion of the total stress, while another portion is transferred by the pressure through the surfaces 21, 22.

In order to transform the axial clamping force of the clamping bolts 12 as completely as possible to a radial clamping force, it is advisable to slit the conical rings 7, 8 in a plane passing through their axis, as indicated by the absence of shading in the drawing. The flanged hub ring 6 naturally must not be slit in the partial area 23, as there it is intended to absorb the annular stress.

The foregoing description is set forth to illustrate the present invention. Clearly, numerous substitutions, additions and other changes can be made to the invention without departing from the scope thereof, as set forth in the appended claims.

What is claimed is:

1. An apparatus for mounting a disk on a shaft, said disk having a central opening through which said shaft extends, said apparatus comprising:
    a flanged hub ring, said hub ring having an axially extending radially thin walled portion having an outer circumferential surface abutting an inner surface of said disk along said central opening, a radially thick walled portion connected to said thin walled portion and disposed outside of said central opening, and a pair of oppositely inclined conical surfaces formed on said hub ring;
    two individual rings split into a plurality of segments, said rings received at axially spaced positions on said shaft, said rings having oppositely inclined conical surfaces mating, respectively, with said conical surfaces of said hub ring; and
    means to move said individual rings relative to each other such that the conical surfaces of said individual rings produce a radially outward pressure on the conical surfaces of said hub ring, said means comprising screws connected to draw said rings toward one another.

2. An apparatus as set forth in claim 1, wherein said radially thick walled portion is positioned axially against an edge of said central opening.

3. An apparatus as set forth in claim 1, wherein said conical surfaces on said hub ring are positioned on radially inner surfaces, respectively, of said thin and thick walled portions.

4. An apparatus as set forth in claim 1, wherein said radially thick walled portion is a continuous ring around said shaft.

5. An apparatus for mounting a disk on a shaft, said disk having a central opening through which said shaft extends, said apparatus comprising:
    a flanged hub ring abutting and connected to a radial surface of said disc, said hub ring having an axially extending radially thin walled portion having an outer circumferential surface abutting an inner surface of said disk thru said central opening, an axially extending radially thick walled portion connected to said thin walled portion and disposed outside of said central opening, and a pair of oppositely inclined conical surfaces formed on said hub ring, said conical surfaces on said hub ring being positioned on radially inner surfaces, respectively, of said thin and thick walled portions;
    two individual rings slit in a plane passing through their axis, said rings received at axially spaced positions on said shaft, said rings having oppositely inclined conical surfaces mating, respectively, with said conical surfaces of said hub ring; and means to move said individual rings relative to each other such that the conical surfaces of said individual rings produce a radially outward pressure on the conical surfaces of said hub ring.

6. An apparatus as set forth in claim 5, wherein said radially thick walled portion is positioned axially against an edge of said central opening.

7. An apparatus as set forth in claim 5, wherein said radially thick walled portion is a continuous ring around said shaft.

8. An apparatus as set forth in claim 5, wherein said means comprises screws connected to draw said rings toward one another.

* * * * *